June 25, 1935.   G. J. MIDTHUN   2,006,026
UNIVERSAL JOINT
Filed March 5, 1934
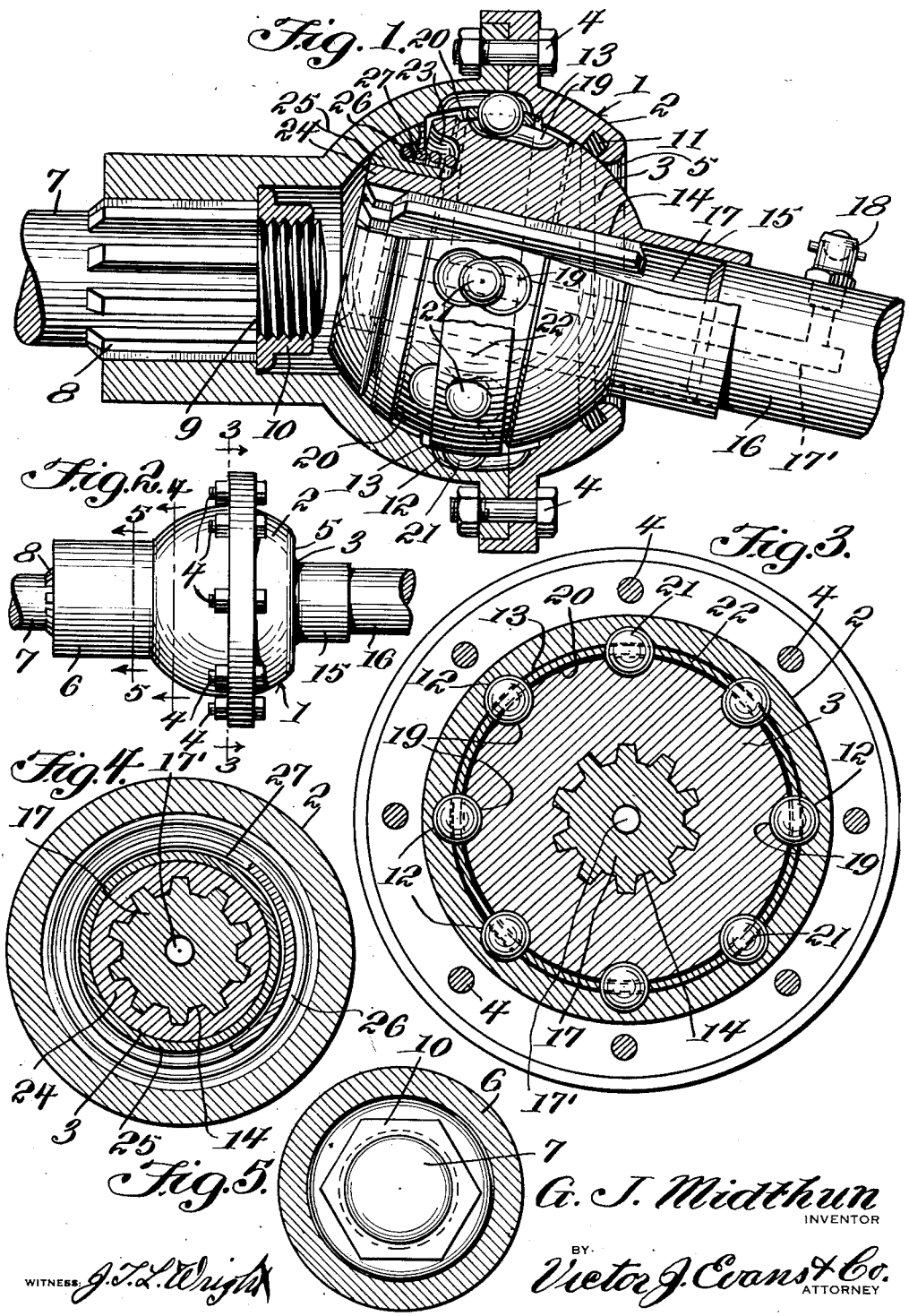
G. J. Midthun
INVENTOR
BY Victor J. Evans & Co.
ATTORNEY
WITNESS: J. T. L. Wright Patented June 25, 1935

2,006,026

UNITED STATES PATENT OFFICE 2,006,026

UNIVERSAL JOINT

Gerhard J. Midthun, Lander, Wyo.

Application March 5, 1934, Serial No. 714,151

1 Claim. (Cl. 64—91)

This invention relates to universal joints and has for the primary object the provision of a device of the above stated character which will efficiently and detachably connect a pair of shafts or similar devices so that one may swing freely relative to the other while transmitting power from one to another and reduces friction to a minimum and is so constructed as to exclude foreign matter and prevent the escape of lubricant.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a universal joint constructed in accordance with my invention.

Figure 2 is a side elevation illustrating the same.

Figure 3 is a sectional view taken on the line 3—3 of Figure 2.

Figure 4 is a similar view taken on the line 4—4 of Figure 2.

Figure 5 is a similar view taken on the line 5—5 of Figure 2.

Referring in detail to the drawing, the numeral 1 indicates in entirety a universal joint consisting of female and male elements 2 and 3, respectively. The female element is in the form of a semi-spherical shaped casing including detachable sections joined together by bolts or like fasteners 4 and one of the sections is provided with a comparatively large opening 5 to permit swinging movement of the male element 3. The other section of the female element has formed integrally therewith a sleeve 6 to receive a shaft 7, the latter being splined to the sleeve, as shown at 8. The sleeve 6 has a bore consisting of two diameters to define an internal shoulder 9. The end of the shaft 7 confined within the bore of the sleeve 6 is reduced and screw threaded to receive a nut 10 which abuts the shoulder 9 and cooperates with the spline 8 anchoring the shaft 7 to the female section of the joint. The female element 2 adjacent the opening 5 is provided with an annular groove to receive a gasket 11 which contacts with the male element 3 for the purpose of excluding foreign matter and prevents the escape of lubricant from the joint by way of the opening 5. Relatively spaced pockets 12 are formed on the inner wall of the female element and the pockets extend into both of the sections of the female element and the latter is also provided with an annular groove 13 communicative with the pockets 12.

The male element 3 is of substantially spherical shape and is provided with a bore 14 and also has formed integrally therewith a sleeve 15 aligning with the bore 14 to receive a shaft 16. The shaft 16 is provided with a reduced portion 17 and this portion lies within the bore 14 and is splined to the substantially spherical portion of the male element. The shaft 16 is drilled to form a lubricant passage 17' one end of which is connected with a lubricant fitting 18 located on the shaft exteriorly of the sleeve 15 and the other end of the passage 17' opens into the bore 14 and thereby permits lubricant to be forced into the interior of the female element for the purpose of lubricating all of the moving parts confined within said female element. The substantially spherical shaped portion of the male element 3 is provided with relatively spaced pockets 19 communicative with the pockets 12 and said substantially spherical-shaped portion of the male element is also provided with an annular groove 20 communicative with the groove 13 of the female element. The pockets 19 in general outline are of 8-shape. Received within the pockets 12 and 19 are balls 21 mounted in a retaining ring 22 which operates in the grooves 13 and 20. The balls engaging with the walls of said pockets establish a drive between the female element and the male element and which will permit the male element to pivot freely relative to the female element. The substantially spherical-shaped portion of the male element is recessed to form a spring seat 23 and a cylindrical portion 24. Slidable upon said portion 24 is a bearing element 25 recessed to form a seat 26. Interposed between the seats is a coil spring 27 normally urging the bearing portion in engagement with the inner wall of the female element. The bearing portion 25 has an outer curved face to conform to the contour of the inner wall of the female element.

A joint constructed in accordance with the foregoing will have maximum flexibility with positive drive between the male and female elements and due to its construction will readily exclude foreign matter from the interior of the joint and retain within the joint lubricant. Also the joint will be self-adjusting to compensate for wear between the male and female elements due to the spring pressed bearing portion 25. The joint may be readily assembled and disassembled when necessary.

Having described the invention, I claim:

A universal joint comprising a female element of substantially spherical shape and including detachable sections, means for connecting a shaft to said female element, a male element received within the female element and shaped to conform to the contour of the latter, means for connecting a shaft to the male element, said male and female elements having communicating pockets, and the pockets of both elements being of substantially 8-shape, balls received by said pockets to establish a drive between the female and male elements, a retaining ring for said balls, said male and female elements having communicating annular grooves to receive the retaining ring, said male element having a recess to form a sleeve-like portion and a spring seat, a bearing portion slidably mounted on the sleeve-like portion and having a recess to form a seat, a coil spring interposed between said seats to urge the bearing element in engagement with the female element.

GERHARD J. MIDTHUN.